US010333420B2

(12) United States Patent
Medagam et al.

(10) Patent No.: US 10,333,420 B2
(45) Date of Patent: Jun. 25, 2019

(54) ACTIVE SINGLE PHASE TO THREE PHASE POWER CONVERTER

(71) Applicant: Phase Technologies, LLC, Rapid City, SD (US)

(72) Inventors: Peda V. Medagam, Rapid City, SD (US); Jack Yang, Rapid City, SD (US)

(73) Assignee: Phase Technologies, LLC, Rapid City, SD (US)

( * ) Notice: Subject to any disclaimer, the term of this patent is extended or adjusted under 35 U.S.C. 154(b) by 26 days.

(21) Appl. No.: 15/798,102

(22) Filed: Oct. 30, 2017

(65) Prior Publication Data

US 2019/0131881 A1    May 2, 2019

(51) Int. Cl.
*H02M 5/293* (2006.01)
*H02M 1/084* (2006.01)

(52) U.S. Cl.
CPC ........... *H02M 5/293* (2013.01); *H02M 1/084* (2013.01); *H02M 2005/2932* (2013.01); *Y02B 70/145* (2013.01)

(58) Field of Classification Search
CPC ................. H02M 1/084; H02M 5/293; H02M 2005/2932; Y02B 70/145
See application file for complete search history.

(56) References Cited

U.S. PATENT DOCUMENTS

| | | | | |
|---|---|---|---|---|
| 5,272,616 A | * | 12/1993 | Divan | H02M 5/14 318/768 |
| 5,402,053 A | * | 3/1995 | Divan | H02M 5/14 318/768 |
| 5,969,957 A | * | 10/1999 | Divan | H02M 5/458 318/768 |
| 6,297,971 B1 | * | 10/2001 | Meiners | H02M 5/4585 363/36 |
| 6,731,525 B2 | | 5/2004 | Meiners | |
| 2017/0170743 A1 | * | 6/2017 | Medagam | H02M 5/458 |

FOREIGN PATENT DOCUMENTS

JP          59127575 A   *  7/1984    ............ H02M 5/293

OTHER PUBLICATIONS

"Single to three phase induction motor sensorless drive system", Z.M.S. El-Barbary, Alexandria Engineering Journal 51, pp. 77-83, 2012.*

(Continued)

*Primary Examiner* — Adolf D Berhane
*Assistant Examiner* — Jye-June Lee
(74) *Attorney, Agent, or Firm* — Ancel W. Lewis, Jr.; Cochran Freund & Young LLC

(57) ABSTRACT

A phase converter that converts single phase AC electric power to balanced three phase AC power. Two input terminals are connectable to a single phase AC power source, and connect directly to two output terminals of the converter. The phase converter has a storage capacitor, three active half bridge modules connected to the storage capacitor and a controller. Two modules connect to the input terminals and charge the storage capacitor. The other module connects to a third output terminal. The controller switches the module connected to the third output terminal and one of the other modules to generate and shape a second phase and a resultant third phase.

2 Claims, 3 Drawing Sheets

(56) References Cited

OTHER PUBLICATIONS

P. Enjeti, A. Rahman and R. Jakkli, "Economic single phase to three phase converter topologies for fixed frequency output," [Proceedings] APEC '91: Sixth Annual Applied Power Electronics Conference and Exhibition, Dallas, TX, USA, 1991, pp. 88-94. (Year: 1991).*

Adapa, Anil K., et al, "Active Phase-Converter for Operation of Three-Phase Induction Motors on Single-Phase Grid", Dept. of Electrical Engineering, Indian Institute of Science, 2017 IEEE, 9 total pages.

* cited by examiner

ACTIVE SINGLE PHASE TO THREE PHASE POWER CONVERTER

TECHNICAL FIELD

The present invention relates to phase converters and more particularly to a phase converter for converting single phase AC power to three phase AC power.

BACKGROUND ART

Three phase AC motors are generally simpler, more reliable and more efficient than single phase AC motors. In addition to three phase AC motors, much high-power industrial equipment requires three phase AC power. The load of such equipment can be inductive, capacitive or resistive.

Three phase AC power is generally supplied to industrial areas. However, only single phase AC power is available to most residential and rural areas. The single phase AC power available in most residential and rural areas is provided by a step down transformer connected to a high voltage line and, in the United States, is normally supplied as about 240 volts or 480 volts at 60 Hz between the first and second input lines.

For areas where three phase AC power is not available, various solutions have been used to convert single phase power to three phase power. For motor load applications, static and rotary converters are a low cost solution. These static and rotary converters, however, have a high percentage of voltage unbalance and low efficiency. Inverters, including AC drives, convert the entire single phase AC input voltage into DC voltage then invert the DC voltage into AC three phase output voltage. Such inverters are generally more complex and expensive than static and rotary converters. The output voltages of such inverters consist of pulse-width-modulated (PWM) signals with high harmonic content, so that the applications of these inverters are limited to inductive motor loads unless additional expensive filtering circuits are used.

U.S. Pat. No. 6,297,971 to Meiners discloses a digital phase converter that converts a single phase input voltage into a three phase output voltage without converting the whole input AC voltage into DC voltage. The converter disclosed converts 240V AC single phase voltage into balanced three phase AC, and can be used for inductive, capacitive and resistive loads with about 1% output voltage imbalance. U.S. Pat. No. 6,731,525 to Meiners discloses another digital phase converter that converts a single phase input voltage into a three phase output voltage without converting the whole input AC voltage into DC voltage.

DISCLOSURE OF THE INVENTION

A phase converter for converting single phase AC power to balanced three phase power AC includes first and second input terminals, first, second and third output terminals, a storage capacitor, active half bridge first, second and third modules, and a controller. The first input terminal connects directly to the first output terminal and the second input terminal connects directly to the second output terminal. The first, second and third modules each have a positive terminal that connects to the positive end of the storage capacitor, a negative terminal that connects to the negative end of the storage capacitor, and an AC terminal. The AC terminal of the first module connects to the first input terminal, the AC terminal of the second module connects to the second input terminal and the AC terminal of the third module connects to the third output terminal. The first, second and third modules each include first and second switches and first and second diodes. The controller connects to the first, second and third modules, selectively driving the first and second switches of the first module to charge the storage capacitor and selectively driving the second and third modules to generate and shape a second phase and a resultant third phase relative to the single phase power, to result in balanced three phase AC power to the first, second and third output terminals.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
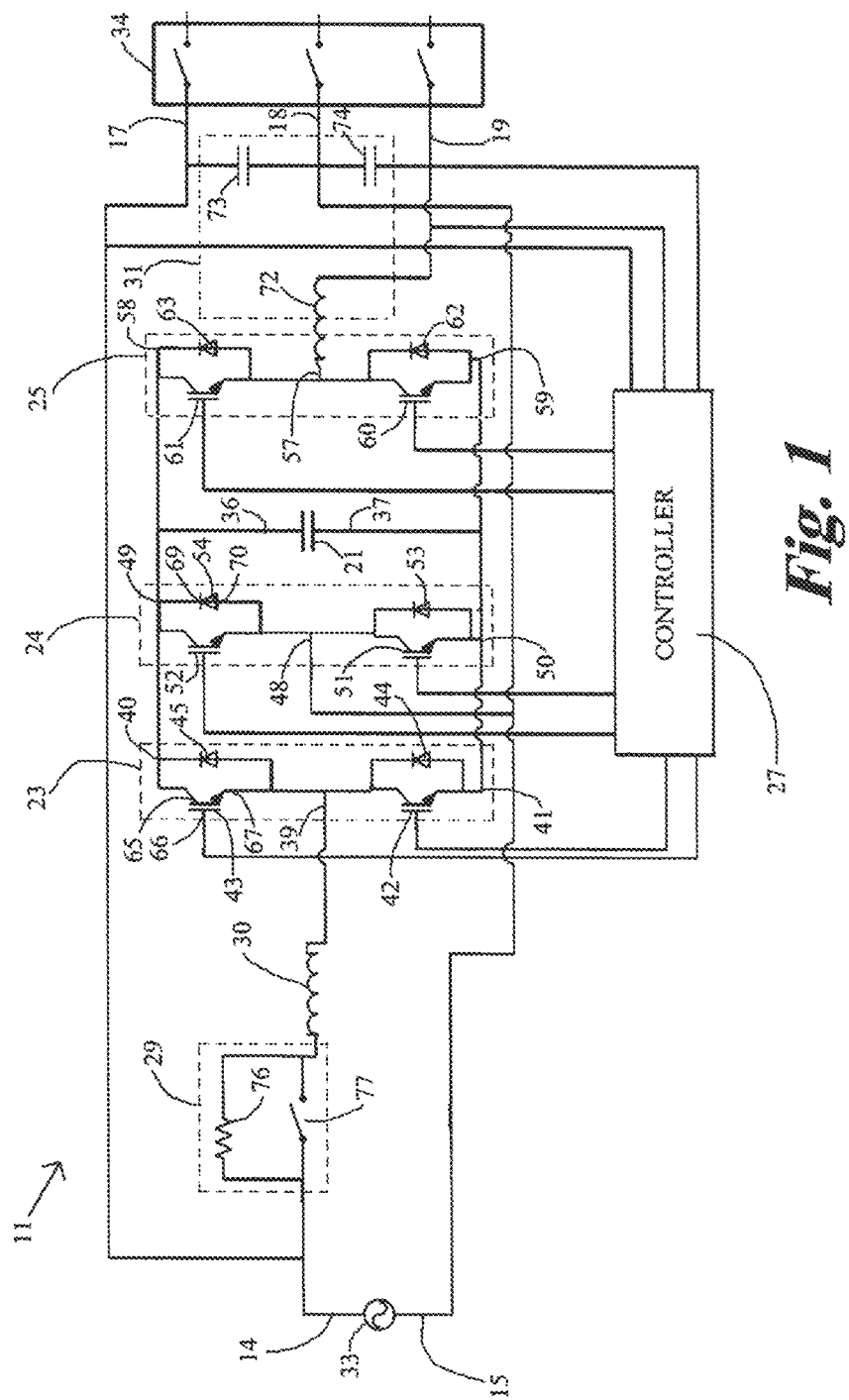
FIG. 1 is a schematic circuit diagram of a phase converter embodying the features of the present invention.

Referring to FIG. 1, a phase converter 11 embodying features of the present invention includes first and second input terminals 14 and 15, first, second and third output terminals 17, 18 and 19, a storage capacitor 21, active half bridge first, second and third modules 23, 24 and 25, and a controller 27. The converter 11 also includes a precharging circuit 29, an input inductor 30 and an output filter 31.

The first and second input terminals 14 and 15 connect to an electrical single phase alternating current (AC) voltage source 33 such as a socket or two terminals connected to a utility company step-down transformer. In the illustrated embodiment the voltage between first and second input terminals 14 and 15 may be 480 VAC. Other voltages are suitable. The first, second and third output terminals 17, 18 and 19 are shown connected to a contactor 34 that can be connected to a three phase load.

The first input terminal connects 14 directly to the first output terminal 17 and the second input terminal 15 connects directly to the second output terminal 18. The precharging circuit 29 connects to the first input terminal 14. The input inductor 30 connects to the precharging circuit 29, opposite the first input terminal 14. The storage capacitor 21 has a positive end 36 and a negative end 37.

The first module 23 includes an AC terminal 39, a positive terminal 40, a negative terminal 41, first and second switches 42 and 43, and first and second diodes 44 and 45. The AC terminal 39 connects to the input inductor 30, opposite the precharging circuit 29. The positive terminal 40 connects to the positive end 36 of the storage capacitor 21. The negative terminal 41 connects to the negative end 37 of the storage capacitor 21.

The second module 24 includes an AC terminal 48, a positive terminal 49, a negative terminal 50, first and second switches 51 and 52, and first and second diodes 53 and 54. The AC terminal 48 connects to the second input terminal 15. The positive terminal 49 connects to the positive end 36 of the storage capacitor 21. The negative terminal 50 connects to the negative end 37 of the storage capacitor 21.

The third module 25 includes an AC terminal 57, a positive terminal 58, a negative terminal 59, first and second switches 60 and 61, and first and second diodes 62 and 63.

The AC terminal 57 connects to the third output terminal 19. The positive terminal 49 connects to the positive end 36 of the storage capacitor 21. The negative terminal 50 connects to the negative end 37 of the storage capacitor 21.

The first switches 42, 51 and 60 and second switches 43, 52 and 61 of the first, second and third modules 23, 24 and 25 are preferably are preferably solid state switches and more preferably Insulated Gate Bipolar Transistors (IGBT). The first switches 42, 51 and 60 and second switches 43, 52 and 61 of the first, second and third modules 23, 24 and 25 each have a collector 65, a base 66 and an emitter 67. The collectors 65 of the first switches 42, 51 and 60 of the first, second and third modules 23, 24 and 25 and the emitters 67 of the second switches 43, 52 and 61 of the first, second and third modules 23, 24 and 25 connect to the respective AC terminals 39, 48 and 57 of the first, second and third modules 23, 24 and 25.

The collectors 65 of the second switches 43, 52 and 61 of the first, second and third modules 23, 24 and 25 connect to the respective positive terminals 40, 49 and 58 of the first, second and third modules 23, 24 and 25. The emitters 67 of the first switches 42, 51 and 60 of the first, second and third modules 23, 24 and 25 connect to the respective negative terminals 41, 50 and 59 of the first, second and third modules 23, 24 and 25. The bases 66 of the first switches 42, 51 and 60 and second switches 43, 52 and 61 of the first, second and third modules 23, 24 and 25 connect to the controller 27.

The first diodes 44, 53 and 62 and second diodes 45, 54 and 63 of the first, second and third modules 23, 24 and 25 each have a cathode 69 and an anode 70. The cathodes 69 of the first diodes 44, 53 and 62 of the first, second and third modules 23, 24 and 25 and the anodes 70 of the second diodes 45, 54 and 63 of the first, second and third modules 23, 24 and 25 connect to the respective AC terminals 39, 48 and 57 of the first, second and third modules 23, 24 and 25. The cathodes 69 of the second diodes 45, 54 and 63 of the first, second and third modules 23, 24 and 25 connect to the respective positive terminals 40, 49 and 58 of the first, second and third modules 23, 24 and 25. The anodes 70 of the first diodes 44, 53 and 62 of the first, second and third modules 23, 24 and 25 connect to the respective negative terminals 41, 50 and 59 of the first, second and third modules 23, 24 and 25.

The output filter 31 includes a filter inductor 72 connected between the AC terminal 57 of the third module 25 and the third output terminal 19, a first filter capacitor 73 connected between the first and second output terminals 17 and 18, and a second filter capacitor 74 connected between the second and third output terminals 18 and 19. The precharging circuit 29 has a resistor 76 and a switch 77 connected in parallel between the first input terminal 14 and the input inductor 30. The switch 77 is preferably a contactor. When power is applied to the converter 11, the switch 77 is open and the resistor 76 limits current to avoid excessively high input current. After the storage capacitor 21 is charged, the switch 77 is closed to bypass the resistor 76.

Figure 2:
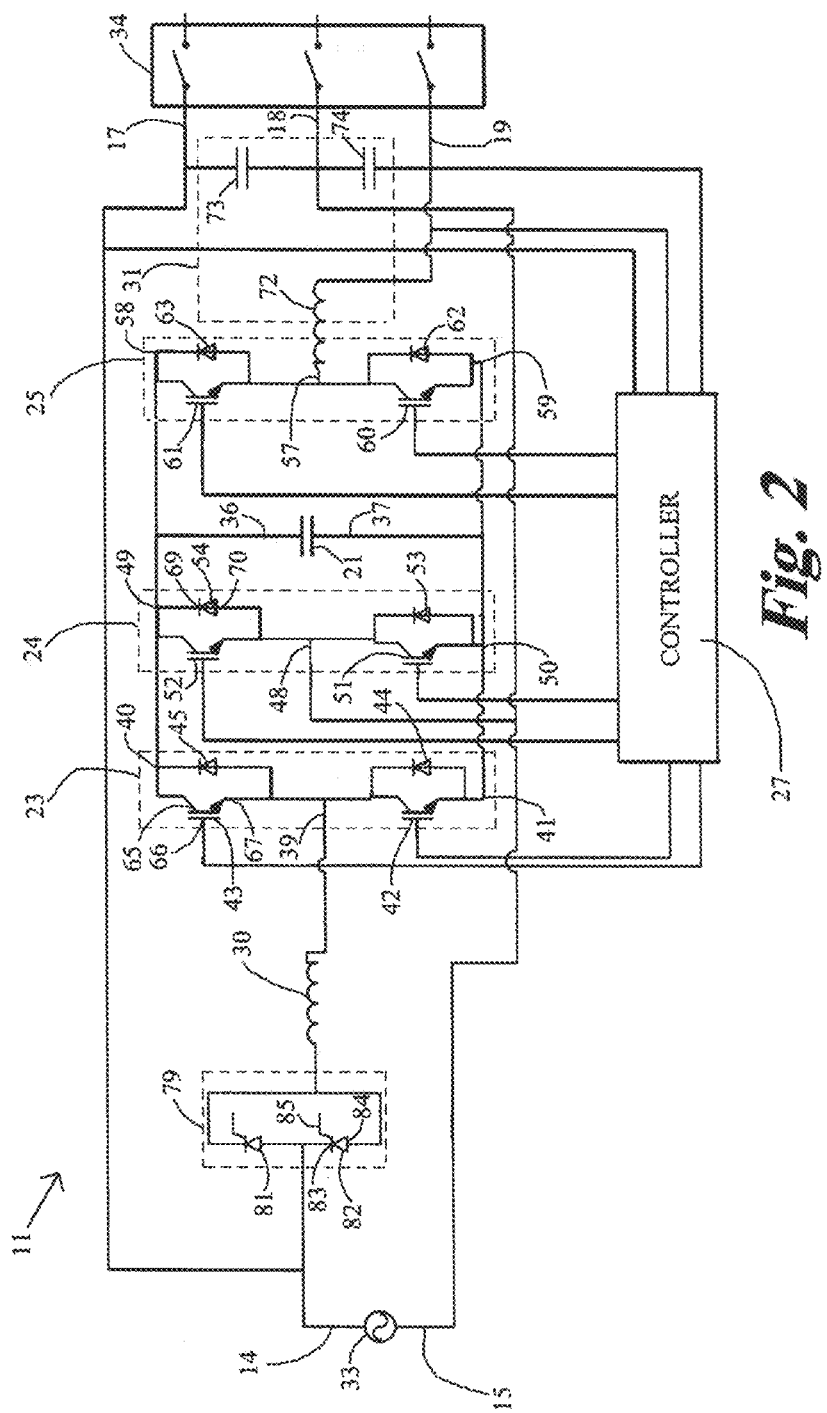
FIG. 2 is a detailed schematic circuit diagram of the converter of FIG. 1 with an alternative precharging circuit.

FIG. 2 shows the converter 11 with an alternative precharging circuit 79 have first and second silicon controlled rectifiers 81 and 82. The first and second silicon controlled rectifiers 81 and 82 each have a cathode 83, an anode 84 and a gate 85. The anode 84 of the first silicon controlled rectifier 81 and the cathode 83 of the second silicon controlled rectifier 82 connect to first input terminal 14. The cathode 83 of the first silicon controlled rectifier 81 and the anode 84 of the second silicon controlled rectifier 82 connect to the input inductor 30. The gates 85 of the first and second silicon controlled rectifiers 81 and 82 connect to and are switched by the controller 27. When power is applied to the converter 11, the first and second silicon controlled rectifiers 81 and 82 are switched to limit current to avoid excessively high input current. After the storage capacitor 21 is charged, the first and second silicon controlled rectifiers 81 and 82 are closed.

The first and second modules 23 and 24 charge the storage capacitor 21. The controller 27 drives the first and second switches 42 and 43 of the first module 23 to maintain a selected voltage on the storage capacitor 21. Proportional integral (PI) control is used to regulate the DC voltage $V_{dc}$ to the reference value $V_{dc}^*$. The DC reference voltage must be higher than or equal to the magnitude of the AC source 33 peak voltage for satisfactory operation of the converter 11. The current command amplitude $I_m$ for the converter 11 can be presented by:

$$I_m = K_P(V_{dc}^* - V_{dc}) + K_I \int (V_{dc}^* - V_{dc}) dt$$

where $K_p$ is the proportional gain constant and $K_I$ is the integral gain constant of the PI control.

In order to achieve unity power factor, the converter current command $i_f^*$ is constrained as follows $$i_f^* = I_m \sin \omega t$$

where $\omega$ is the input angular frequency and is calculated by using a Phase Locked Loop (PLL).

The second and third modules 24 and 25 generate the second phase voltage $V_{23}$ and the resultant third phase voltage $V_{31}$. The controller 27 drives the first and second switches 51, 52, 60 and 61 of the second and third modules 24 and 25 to generate the voltage $V_{23}$, which is equal in magnitude to the input voltage $V_{12}$ from the AC source 33 and 120° out of phase with respect to voltage $V_{12}$.

Figure 3:
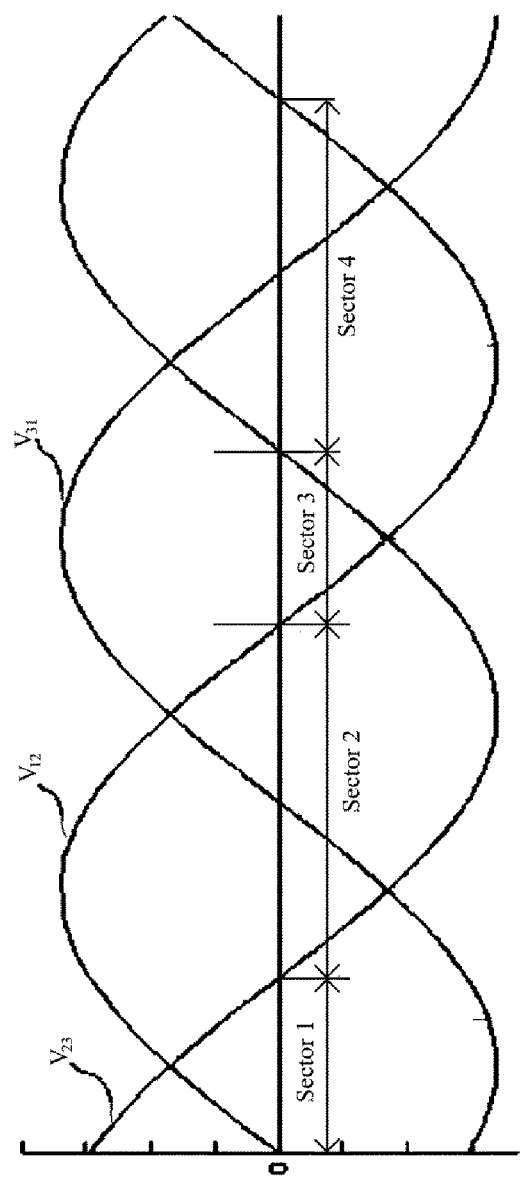
FIG. 3 is a graphical representation of the output voltages of the phase converter of the present invention.

FIG. 3 shows the output voltages of the converter 11. In the following description the first switch 51 of the second module 24 is Z3, the second switch 52 of the second module 24 is Z4, the first switch 60 of the third module 25 is Z5 and the second switch 61 of the third module 25 is Z6. The switching scheme to generate the waveform shown is divided into sectors based on $V_{12}$ and $V_{23}$ voltages. The possible sector combinations are:

Sector 1: $V_{12}$ is positive and $V_{23}$ is positive
Switch Z5=ON, Z6=OFF, Switches Z4 and Z3 are controlled to shape $V_{23}$ voltage into $V_{12} \sin(\omega t + 120°)$ Sector 2: $V_{12}$ is positive and $V_{23}$ is negative
Switch Z3=ON, Z4=OFF, Switch Z5 and Z6 are controlled to shape $V_{23}$ voltage into $V_{12} \sin(\omega t + 120°)$ Sector 3: $V_{12}$ is negative and $V_{23}$ is negative
Switch Z5=OFF, Z6=ON, Switch Z4 and Z3 are controlled to shape $V_{23}$ voltage into $V_{12} \sin(\omega t + 120°)$ Sector 4: $V_{12}$ is negative and $V_{23}$ is positive
Switch Z3=ON, Z4=OFF, Switch Z5 and Z6 are controlled to shape $V_{23}$ voltage into $V_{12} \sin(\omega t + 120°)$ As shown, Sector 1 extends from 0° to 60°, Sector 2 from 60° to 180°, Sector 3 from 180° to 240°, and Sector 4 from 240° to 360°, relative to $V_{12}$.

The controller 27 drives the first switches 42, 51 and 60 and second switches 43, 52 and 61 of the first, second and third modules 23, 24 and 25 with pulse width modulation (PWM). The output filter 31 converts the PWM signal at the AC terminal 57 of the third module 25 to a pure sine wave. The converter 11 can convert excess three phase AC power from a load to single phase AC power for return to the power grid. The controller 27 drives the first and second switches 42 and 43 of the first module 23 with PWM and the input inductor 30 converts the PWM signal to a pure sine wave that is 180° out of phase with respect to input voltage $V_{12}$.

Although the present invention has been described with a certain degree of particularity, it is understood that the present disclosure has been made by way of example and that changes in details of structure may be made without departing from the spirit thereof.

What is claimed is:

1. A phase converter for converting single phase AC power to balanced three phase AC power comprising:

first and second input terminals, first, second and third output terminals for connection to a three phase load, said first output terminal being directly connected to said first input terminal and said second output terminal being directly connected to said second input terminal, a storage capacitor having a positive end and a negative end, an active half bridge first module having an AC terminal connected to said first input terminal, a positive terminal connected to said positive end of said storage capacitor, and a negative terminal connected to said negative end of said storage capacitor, an active half bridge second module having an AC terminal connected to said second input terminal, a positive terminal connected to said positive end of said storage capacitor, and a negative terminal connected to said negative end of said storage capacitor, an active half bridge third module having an AC terminal connected to said third output terminal, a positive terminal connected to said positive end of said storage capacitor, and a negative terminal connected to said negative end of said storage capacitor, an output filter connected between said AC terminal of said third module and said first, second and third output terminals, wherein said output filter includes a filter inductor connected between said AC terminal of said third module and said third output terminal, a first filter capacitor connected between said first and second output terminals and a second filter capacitor connected between said second and third output terminals, and a controller connected to said first, second and third modules, said controller selectively driving said first and second switches of said first module to charge said storage capacitor and selectively driving said second and third modules to generate and shape a second phase and a resultant third phase relative to said single phase power, to result in said balanced three phase AC power to said first, second and third output terminals.

2. A phase converter for converting single phase AC power to balanced three phase AC power comprising:

first and second input terminals, first, second and third output terminals for connection to a three phase load, said first output terminal being directly connected to said first input terminal and said second output terminal being directly connected to said second input terminal, a storage capacitor having a positive end and a negative end, a precharging circuit connected to said first input terminal, an input inductor connected to said precharging circuit opposite said first input terminal, an active half bridge first module having an AC terminal connected to said input inductor opposite said precharging circuit, a positive terminal connected to said positive end of said storage capacitor, and a negative terminal connected to said negative end of said storage capacitor, said first module including first and second switches each having a collector, a base and an emitter, and first and second diodes each having an anode and a cathode, said collector of said first switch, said emitter of said second switch, said cathode of said first diode and said anode of said second diode connecting to said AC terminal, said emitter of said first switch and said anode of said first diode connecting to said negative terminal, and said collector of said second switch and said cathode of said second diode connecting to said positive terminal, an active half bridge second module having an AC terminal connected to said second input terminal, a positive terminal connected to said positive end of said storage capacitor, and a negative terminal connected to said negative end of said storage capacitor, said second module including first and second switches each having a collector, a base and an emitter, and first and second diodes each having an anode and a cathode, said collector of said first switch, said emitter of said second switch, said cathode of said first diode and said anode of said second diode connecting to said AC terminal, said emitter of said first switch and said anode of said first diode connecting to said negative terminal, and said collector of said second switch and said cathode of said second diode connecting to said positive terminal, an active half bridge third module having an AC terminal, a positive terminal connected to said positive end of said storage capacitor, and a negative terminal connected to said negative end of said storage capacitor, said third module including first and second switches each having a collector, a base and an emitter, and first and second diodes each having an anode and a cathode, said collector of said first switch, said emitter of said second switch, said cathode of said first diode and said anode of said second diode connecting to said AC terminal, said emitter of said first switch and said anode of said first diode connecting to said negative terminal, and said collector of said second switch and said cathode of said second diode connecting to said positive terminal, an output filter including a filter inductor connected between said AC terminal of said third module and said third output terminal, a first filter capacitor connected between said first and second output terminals and a second filter capacitor connected between said second and third output terminals, and a controller connected to said bases of said first and second switches of said first, second and third modules, said controller selectively driving said first and second switches of said first module to charge said storage capacitor and selectively driving said first and second switches of said second and third modules to generate and shape a second phase and a resultant third phase relative to said single phase power, to result in said balanced three phase AC power to said first, second and third output terminals.

* * * * *